US006574618B2

United States Patent
Eylon et al.

(10) Patent No.: US 6,574,618 B2
(45) Date of Patent: Jun. 3, 2003

(54) METHOD AND SYSTEM FOR EXECUTING NETWORK STREAMED APPLICATION

(75) Inventors: Dan Eylon, Ramat Hasharon (IL); Amit Ramon, Zoran (IL); Yehuda Volk, Tel-Aviv (IL); Uri Raz, Fairlawn, NJ (US); Shmuel Melamed, Ramat-Gan (IL)

(73) Assignee: AppStream, Inc., Palo Alto, CA (US)

( * ) Notice: Subject to any disclaimer, the term of this patent is extended or adjusted under 35 U.S.C. 154(b) by 350 days.

(21) Appl. No.: 09/750,835

(22) Filed: Dec. 28, 2000

(65) Prior Publication Data

US 2001/0034736 A1 Oct. 25, 2001

(Under 37 CFR 1.47)

Related U.S. Application Data

(63) Continuation-in-part of application No. 09/120,575, filed on Jul. 22, 1998, now Pat. No. 6,311,221.
(60) Provisional application No. 60/235,535, filed on Sep. 26, 2000.

(51) Int. Cl.[7] ............................ G06F 17/30; G06F 9/40; G06F 15/16
(52) U.S. Cl. ............................ 707/1; 707/100; 707/101; 707/102; 707/103 R; 707/104.1; 709/231; 709/329; 709/240; 709/331
(58) Field of Search .............................. 707/1, 100, 10, 707/101, 102, 103 R, 104.1; 709/231, 329, 240, 331

(56) References Cited

U.S. PATENT DOCUMENTS

| | | | |
|---|---|---|---|
| 5,163,131 A | 11/1992 | Row et al. | 395/200 |
| 5,487,167 A | 1/1996 | Dinallo et al. | 395/650 |
| 5,504,886 A | 4/1996 | Chang et al. | 395/600 |

(List continued on next page.)

FOREIGN PATENT DOCUMENTS

| | | |
|---|---|---|
| WO | WO/97/46955 | 12/1997 |
| WO | PCT/US99/16055 | 7/1999 |
| WO | PCT/US00/02190 | 6/2000 |
| WO | WO/00/46685 | 8/2000 |
| WO | WO 00/62161 | 10/2000 |

OTHER PUBLICATIONS

G. Glass, "A Universal Streaming Service", C++ Report, Apr. 1996, pp. 74–83.
T. Ritchey, "Java!", New Riders Publishing, 1995, pp. 214–216.
Chen et al., "Real–Time Video and Audio in the World Wide Web" World Wide Web Journal, Dec. 11–14, 1995, pp. 333–348.
Jiang et al., "Prefetching Links on the WWW", Department of Computer Science University of California, 1997, pp. 483–489.

(List continued on next page.)

Primary Examiner—Frantz Coby
(74) Attorney, Agent, or Firm—Mitchell S. Feller; Clifford Chance US LLP

(57) ABSTRACT

A method and system for executing a streamed application on a client system utilizes a virtual file system installed in the client which is configured to appear to the operating system as a local storage device containing all of the application files required by the application. Prior to streaming, the application files are broken up into streamlets corresponding generally to various portions of the application files and these streamlets are delivered to the client by the server, preferably using a predictive algorithm to determine an optimal transmission order. After an initial set of streamlets is received, the application is executed from the virtual file system. File loads issued by the operating system to the virtual file system are translated to determine which streamlets correspond to the load request and the appropriate data is returned. If a needed streamlet is not present, a streamlet request is issued to the server and the virtual file system maintains a busy status until the necessary streamlets have been provided.

46 Claims, 8 Drawing Sheets

U.S. PATENT DOCUMENTS

| | | | |
|---|---|---|---|
| 5,581,706 A | 12/1996 | Jessup, Jr. et al. | 395/200 |
| 5,581,764 A | 12/1996 | Fitzgerald et al. | 395/703 |
| 5,708,796 A | 1/1998 | Ozden et al. | 395/494 |
| 5,712,976 A | 1/1998 | Falcon, Jr. et al. | 395/200 |
| 5,742,768 A | 4/1998 | Gennaro et al. | 295/200 |
| 5,745,380 A | 4/1998 | Sandvoss et al. | 364/514 |
| 5,754,774 A | 5/1998 | Bittinger et al. | 395/200 |
| 5,761,477 A | 6/1998 | Wahbe et al. | 395/406 |
| 5,764,235 A | 6/1998 | Hunt et al. | 345/428 |
| 5,765,164 A | 6/1998 | Prasad et al. | 707/104 |
| 5,787,284 A | 7/1998 | Blainey et al. | 395/701 |
| 5,802,292 A | 9/1998 | Mogul | 395/200 |
| 5,835,749 A | 11/1998 | Cobb | 395/500 |
| 5,878,223 A | 3/1999 | Becker et al. | 395/200 |
| 5,919,247 A | 7/1999 | Van Hoff et al. | 709/217 |
| 5,933,644 A | 8/1999 | Wallace | 395/709 |
| 5,974,129 A | 10/1999 | Bodnar | 379/207 |
| 5,978,788 A | 11/1999 | Castelli et al. | 70/2 |
| 5,978,791 A | 11/1999 | Farber et al. | 707/2 |
| 6,003,087 A | 12/1999 | Housel, III et al. | 709/229 |
| 6,009,410 A | 12/1999 | LeMole et al. | 705/14 |
| 6,047,323 A * | 4/2000 | Krause | 709/227 |
| 6,073,129 A | 6/2000 | Levine et al. | 707/4 |
| 6,088,524 A | 7/2000 | Levy et al. | 395/603 |
| 6,101,495 A | 8/2000 | Tsuchida et al. | 707/4 |
| 6,108,703 A | 8/2000 | Leighton et al. | 709/226 |
| 6,122,628 A | 9/2000 | Castelli et al. | 707/5 |
| 6,311,221 B1 * | 10/2001 | Raz et al. | 709/231 |

OTHER PUBLICATIONS

M. Schwartz, "Telecommunication Networks: Protocols, Modeling and Analysis", Addison–Wesley Publishing Company, pp. 266–283.

J. Basu et al., "Degrees of Transaction Isolation in SQL *Cache: A Predicate–based Client side Caching System", May 15, 1996, pp. 1–22.

S. Shepler, "NFS Version 4 Design Considerations", internet site .ietf.org, Jun. 1999, pp. 1–19.

Amit Shukla et al., "Storage Estimation for Multidimensional Aggregates in the Presence of Hierarchies", VLDB Conference Mumbai (Bombay), 1996, pp. 522–531.

Dale Skeen, "New Forms Of Persistent Queries Are Necessary To Handle Live Business Data As It Speeds Through A Company", internet website www.byte.com BYTE Magazine, Feb. 1998, pp. 1–5, 1–2, 1–2.

E. Markatos, "On Caching Search Engine Query Results", internet website www.ii.uib.no, Oct. 5, 2000, pp. 1–14.

"WTE Programming Guide", internet website ww.4.ibm.com, Oct. 5, 2000, pp. 1–40.

J. Song et al., "Design Alternatives for Scalable Web Server Accelerators", IBM T.J. Watson Research Center, pp. 1–20.

V. Hoff et al., "The Open Software Description Format (OSD)", internet website www.w3.org, Aug. 11, 1997, pp. 1–13.

Red Brick Vista, "Aggregate Computation and Management", internet website www.informix.com, Oct. 4, 2000.

Fireclick, "Web Site Performance is Key to E–Commerce Success", internet website Fireclick.com, Nov. 1, 2000.

Boost Web Optimizer Technology Overview, "How it Works", Sep. 27, 2000.

"Delivering Windows to the Net White Paper", Menta Software, 2000.

"First There was Streaming Audio, then Streaming Video. Now get ready for Streaming Software", Stream Theory, 2000.

"OSD Describing Software Packages on the Internet", internet website www. marimba.com, 1998.

"Understanding Centralized Management of Server Content and Applications", Marimba, 2000, pp. 1–16.

"Timbale for Windows Terminal Services", Marimba.

* cited by examiner

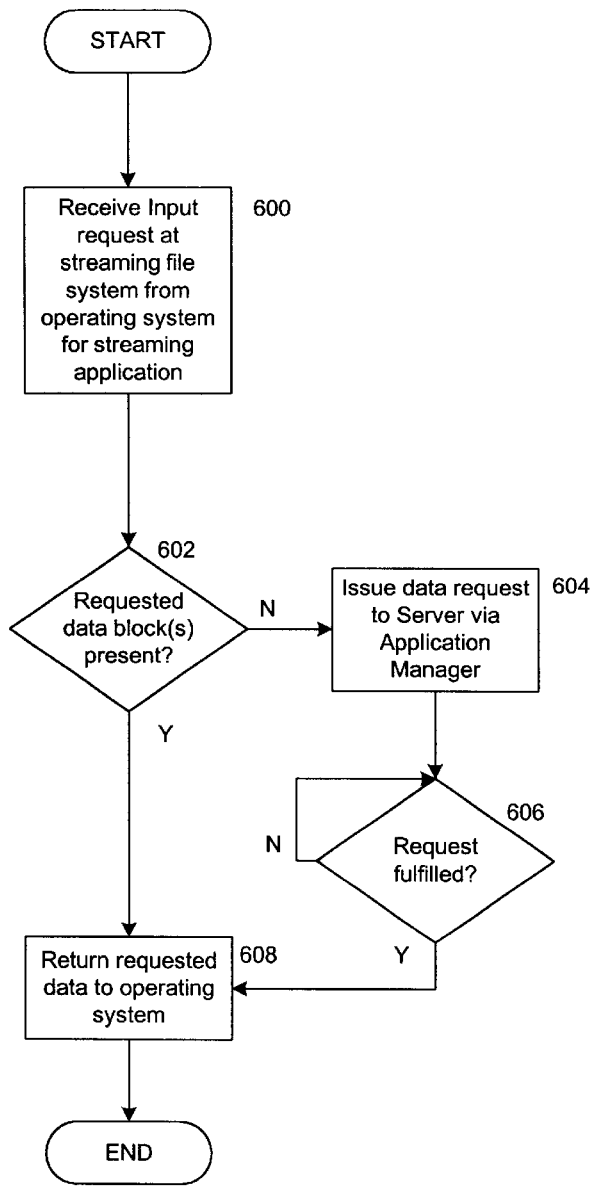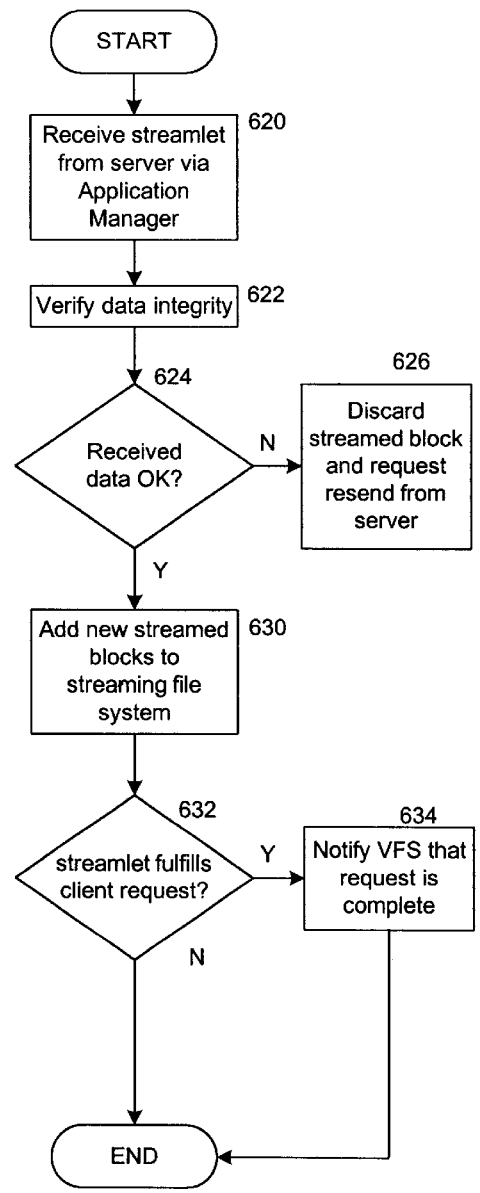
FIG. 6A
FIG. 6B

METHOD AND SYSTEM FOR EXECUTING NETWORK STREAMED APPLICATION

CROSS-REFERENCE TO RELATED APPLICATIONS

The present application claims the benefit under 35 U.S.C. § 119 of U.S. Provisional Application Ser. No. 60/235,535 entitled "Native Streaming Architecture", filed on Sep. 26, 2000, the entire contents of which is hereby expressly incorporated by reference. The present application is also a continuation-in part of U.S. patent application Ser. No. 09/120,575 entitled "Streaming Modules" and filed on Jul. 22, 1998, now U.S. Pat. No. 6,311,221 the entire contents of which is hereby expressly incorporated by reference.

This application is also related to the following pending U.S. patent applications, the entire contents of which is hereby expressly incorporated by reference: (a) U.S. patent application Ser. No. 09/237,792 entitled "Link Presentation and Data Transfer" and filed on Jan. 26, 2000; now abandoned (b) U.S. Provisional Patent Application Ser. No. 60/177,736 entitled "Method and Apparatus for Determining Order of Streaming Modules" and filed on Jan. 21, 2000; (c) U.S. Provisional Patent Application Ser. No. 60,177,444 entitled "Method and Apparatus for Improving the User-Perceived System Response Time in Web-based Systems" and filed on Jan. 21, 2000; and (d) U.S. Provisional Patent Application Ser. No. 60/207,632 entitled "Apparatus and Method for Improving the Delivery of Software Applications and Associated data in Web-based Systems" and filed in May 25, 2000.

FIELD OF THE INVENTION

The present invention is directed to a method, system, and architecture for streaming applications from a server for execution on a client, and, more particularly, a method and system for executing streamed applications on a client system.

BACKGROUND

The Internet, and particularly the world-wide-web, is a rapidly growing network of interconnected computers from which users can access a wide variety of information. Initial widespread use of the Internet was limited to the delivery of static information. A newly developing area of functionality is the delivery and execution of complex software applications via the Internet. There are two basic techniques for software delivery, remote execution and local delivery, e.g., by downloading.

In a remote execution embodiment, a user accesses software which is loaded and executed on a remote server under the control of the user. One simple example is the use of Internet-accessible CGI programs which are executed by Internet servers based on data entered by a client. A more complex systems is the Win-to-Net system provided by Menta Software. This system delivers client software to the user which is used to create a Microsoft Windows style application window on the client machine. The client software interacts with an application program executing on the server and displays a window which corresponds to one which would be shown if the application were installed locally. The client software is further configured to direct certain I/O operations, such as printing a file, to the client's system, to replicate the "feel" of a locally running application. Other remote-access systems, such as provided by Citrix Systems, are accessed through a conventional Internet Browser and present the user with a "remote desktop" generated by a host computer which is used to execute the software.

Because the applications are already installed on the server system, remote execution permits the user to access the programs without transferring a large amount of data. However, this type of implementation requires the supported software to be installed on the server. Thus, the server must utilize an operating system which is suitable for the hosted software. In addition, the server must support separately executing program threads for each user of the hosted software. For complex software packages, the necessary resources can be significant, limiting both the number of concurrent users of the software and the number of separate applications which can be provided.

In a local delivery embodiment, the desired application is packaged and downloaded to the user's computer. Preferably, the applications are delivered and installed as appropriate using automated processes. After installation, the application is executed. Various techniques have been employed to improve the delivery of software, particularly in the automated selection of the proper software components to install and initiation of automatic software downloads. In one technique, an application program is broken into parts at natural division points, such as individual data and library files, class definitions, etc., and each component is specially tagged by the program developer to identify the various program components, specify which components are dependent upon each other, and define the various component sets which are needed for different versions of the application.

Once such tagging format is defined in the Open Software Description ("OSD") specification, jointly submitted to the World Wide Web Consortium by Marimba Incorporated and Microsoft Corporation on Aug. 13, 1999. Defined OSD information can be used by various "push" applications or other software distribution environments, such as Marimba's Castanet product, to automatically trigger downloads of software and ensure that only the needed software components are downloaded in accordance with data describing which software elements a particular version of an application depends on.

Although on-demand local delivery and execution of software using OSD/push techniques is feasible for small programs, such as simple Java applets, for large applications, the download time can be prohibitively long. Thus, while suitable for software maintenance, this system is impractical for providing local application services on-demand because of the potentially long time between when the download begins and the software begins local execution.

Recently, attempts have been made to use streaming technology to deliver software to permit an application to begin executing before it has been completely downloaded. Streaming technology was initially developed to deliver audio and video information in a manner which allowed the information to be output without waiting for the complete data file to download. For example, a full-motion video can be sent from a server to a client as a linear stream of frames instead of a complete video file. As each frame arrives at the client, it can be displayed to create a real-time full-motion video display. However, unlike the linear sequences of data presented in audio and video, the components of a software application may be executed in sequences which vary according to user input and other factors.

To address this issue, as well as other deficiencies in prior data streaming and local software delivery systems, an improved technique of delivering applications to a client for local execution has been developed. This technique is described in parent U.S. patent application Ser. No. 09/120, 575, entitled "Streaming Modules" and filed on Jul. 22, 1998, now U.S. Pat. No. 6,311,221.

In a particular embodiment of the "Streaming Modules" system, a computer application is divided into a set of modules, such as the various Java classes and data sets which comprise a Java applet. Once an initial module or modules are delivered to the user, the application begins to execute while additional modules are streamed in the background. The modules are streamed to the user in an order which is selected to deliver the modules before they are required by the locally executing software. The sequence of streaming can be varied in response to the manner in which the user operates the application to ensure that needed modules are delivered prior to use as often as possible. To reduce streaming time, the size of code files, such as library modules, can be reduced by substituting various coded procedures with shortened streaming "stub" procedures which act as link-time substitutes for the removed code. Suitable modules to replace are those which are not required for the initial execution of the application. As the application is running locally on the client, additional modules are streamed to the client and the stub code can be dynamically replaced as the substituted procedures are received. The stub procedure can point to a streaming engine which will request a missing procedure if the program calls it before it has been received at the client.

Although effective, the stub-code substitution technique used in the "Streaming Modules" system may require a reasonable degree of processing to prepare a given application for streaming. In addition, the client software required to manage the streamed modules does not necessarily integrate cleanly with the normal routines used by the operating system executing on the client machine.

Accordingly, there is a need to provide streamed applications and supporting streaming management software in a manner which more closely aligns with how a locally running application would actually be loaded and executed.

SUMMARY OF THE INVENTION

The present invention is directed to a method, system, and architecture which enables local execution of application programs on a Client computer while delivering the application code and data from a central Server and over a network, such as the Internet, or other data network, such as a wired or wireless TCP/IP Wide Area Network (WAN). The application does not need to be installed on the Client PC. Instead, the application is streamed to the client's system in streamlets or blocks which are stored in a persistent client-side cache and the system is configured such that the application can begin to execute on the client machine after only a small fraction of the application is loaded.

More specifically, the application to be executed is stored as a set of blocks or "streamlets" (parts into which the application has been divided) on a server. In a preferred embodiment, each streamlet blocks corresponds to a data block which would be processed by the native operating system running on the client system were the entire application locally present. For example, standard Windows systems utilize a 4 k code page when loading data blocks from disk or in response to paging requests. Preferably, each streamlet is stored in a pre-compressed format on the server and decompressed upon receipt by the client.

A set of streaming control modules are installed on the client system and include an intelligent caching system which is configured as a sparsely populated virtual file system ("VFS") which is accessed via a dedicated streaming file system ("FSD") driver. The VFS will appear to the operating system to be a local drive which contains the entire application. However, in practice, only pieces of the various files required for execution of the application may actually be present.

During normal operation of an application, the Windows operating system will periodically generate page faults and associated paging requests to load portions of the application into memory. Standard operating system procedures direct these I/O requests to the proper data device driver for processing. When the streaming application is initialized, the operating system is informed that the relevant data is stored on the VFS drive. Thus, as the streaming application executes and paging or data I/O requests are generated to retrieve require code or data, the operating system will automatically direct it to the FSD driver which then passes it in the proper format to the VFS caching system for processing.

If the requested streamlets are present in the VFS, the data is returned to the operating system and the streaming program continues normal operation. If one or more of the requested streamlet blocks are absent from the VFS, a fetch request is issued to the server for the appropriate streamlet blocks. When the streamlets are returned, they are stored in the VFS and the read or paging request from the operating system is satisfied. Application streamlet data can be persistently stored on the client between sessions such that subsequent uses of the same application will result in an immediate startup. Persistent data can be retained within the client's VFS itself or an image or snapshot of the VFS can be made and stored elsewhere on the client system, which snapshot can be reloaded into the VFS when needed.

To improve responsiveness of the system when the application is not fully loaded in the cache, a predictive engine can be used on the server. Based upon information gathered from user interaction with the application at issue, a statistical usage model can be built which tracks the order in which users access the various streamlets. When a client starts a streaming application, an initial set of streamlets sufficient to enable the application to begin execution is forwarded to the client. Additional application streamlets can then be actively pushed to the client in accordance with the predictive model and possibly additional data forwarded to the server from the client while the application executes. As a result, many of the needed streamlets will be present in the client-side cache before they are needed.

Advantageously, the present architecture described enables a positive user experience with streamed applications without requiring constant use of broadband data links. In addition, and unlike remote-access application systems, the streaming applications execute on the client machine and server and network resources are utilized for delivery only. As a result, server and network load are reduced, allowing for very high scalability of the server-based application delivery service which can deliver, update and distribute applications to a very large number of users, as well as perform centralized version updates, billing, and other management operations. Furthermore, because the application server does not run application code but only delivers streamlets to the client, it can run on operating systems other than the application target operating system, such as Unix derivatives or other future operating systems, as well as Windows-based servers. In addition, the application streaming system is source code independent. Applications are packaged automatically on the server in accordance with an analysis of the sequence in which the application is loaded into memory during execution. No changes to the application itself are required.

The present invention can be used as an enabling technology for remote application hosting, or application service provision (ASP). As broadband technology for connecting end-users to the Internet becomes more widespread, the advantages of application hosting and provision become more convincing and overpowering. However, since bandwidth limitations are likely to exist for some time, especially when compared to the bandwidth available to a locally executed application, the present invention provides ways to enhance an application delivery and make it more efficient, while at the same time creating a layer of separation between the Client and the Server, enabling much better control over server integrity and security.

BRIEF DESCRIPTION OF THE FIGURES

The foregoing and other features of the present invention will be more readily apparent from the following detailed description and drawings of illustrative embodiments of the invention in which:

FIGS. 5 and 6A–6B are high-level flow diagrams illustrating the operation of the client streaming software;

DETAILED DESCRIPTION OF THE PREFERRED EMBODIMENT(S)

Figure 1:
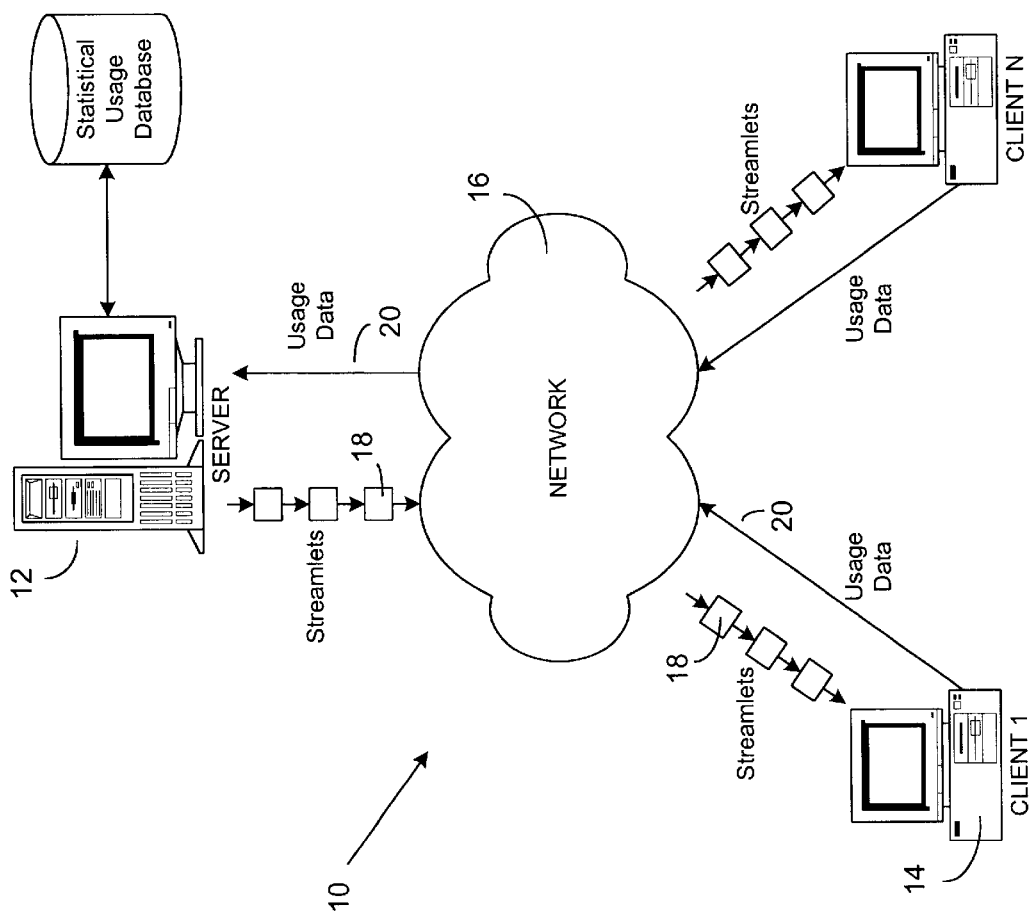
FIG. 1 is a block diagram of a system for implementing the present invention.

Turning to FIG. 1, there is shown block diagram of a system 10 implementing various aspects of the present invention. The system includes a server 12 which is connected to one or more clients 14 via a data network 16, such as the Internet, an intranet, extranet or other TCP/IP based communication network, or other types of data networks, including wireless data networks.

Prior to streaming an application, the application files are divided into small segments called streamlets. Rather than delivering an entire application prior to execution, the server delivers information about the application files and preferably a small portion of the application itself. In particular, the client receives a file structure specification which defines how files associated with the application and required for the application to operate appear to a computer when the application is locally installed. In particular, the file structure specification defines the structure of at least the primary application file which is loaded by the operating system when the application is initially executed.

In addition, a startup streamlet set is preferably sent to the client and which includes at least those streamlets containing the portions of the application required to enable execution of the application to be initiated. Preferably, the startup streamlet set comprises those streamlets required to begin application execution and have the application run to a point where user interaction is required. Most preferably, the file structure specification and the startup streamlet(s) are provided to the client packaged in a Startup Block or Init Block. In addition, further application information, such as environmental variable settings, additions to system control files, and other system modifications or additions which may be required to "virtually install" the application can be provided. A preferred technique for determining the contents of the Startup Block and defining the various streamlets for a given application is disclosed in U.S. patent application entitled "Method and System for Streaming Software Applications to a Client" and filed concurrently with the present application, the entire contents of which is expressly incorporated by reference.

Once the streamlets in the startup block (or streamlet set) are received and loaded, e.g., during a short streaming initialization phase, and provided environmental information is processed, the application is executed. Even though typically only a small fraction of the application's files (or portions thereof) are locally present on the client, enough is generally present to for the application to run to the point that user interaction is required. The remaining application streamlets can be delivered to the client automatically by the server or in response to fetch requests issued by the client. Preferably, the streamlets are delivered to the client in compressed form and decompressed as they are received and stored locally in a Virtual File System. The streamlets can be forwarded to the client individually or grouped together and pushed to the client in clusters as appropriate.

As discussed in more detail below, the client-side virtual file system can be configured as a sparsely populated virtual file system which will appear to the operating system as a local drive on which all the files needed by the streaming application reside. When a required segment is not present on the client machine, the client issues a request for the appropriate streamlet(s) to the server. Usage information 20 can also be sent from the client 14 to the server 12 and can be used by the server to determine which streamlets to provide next.

Preferably, the server is configured to automatically forward sequences of streamlets to the client using a predictive streaming engine which selects streamlets to forward according to dynamic statistical knowledge base generated by analyzing the various sequences in which the application program attempts to load itself into memory as various program features are accessed. Such a knowledge base can be generated by analyzing the past and present behavior of the current user, the behavior of the entire user group, or the behavior of subsets within that group. As a result, the streamlets 18 which are predicted to be needed at a given point during execution are automatically sent to the client 14 so that they are generally present before the application attempts to access them. Both code and data, including external files used by the application, can be predictively streamed in this manner.

Figure 2:
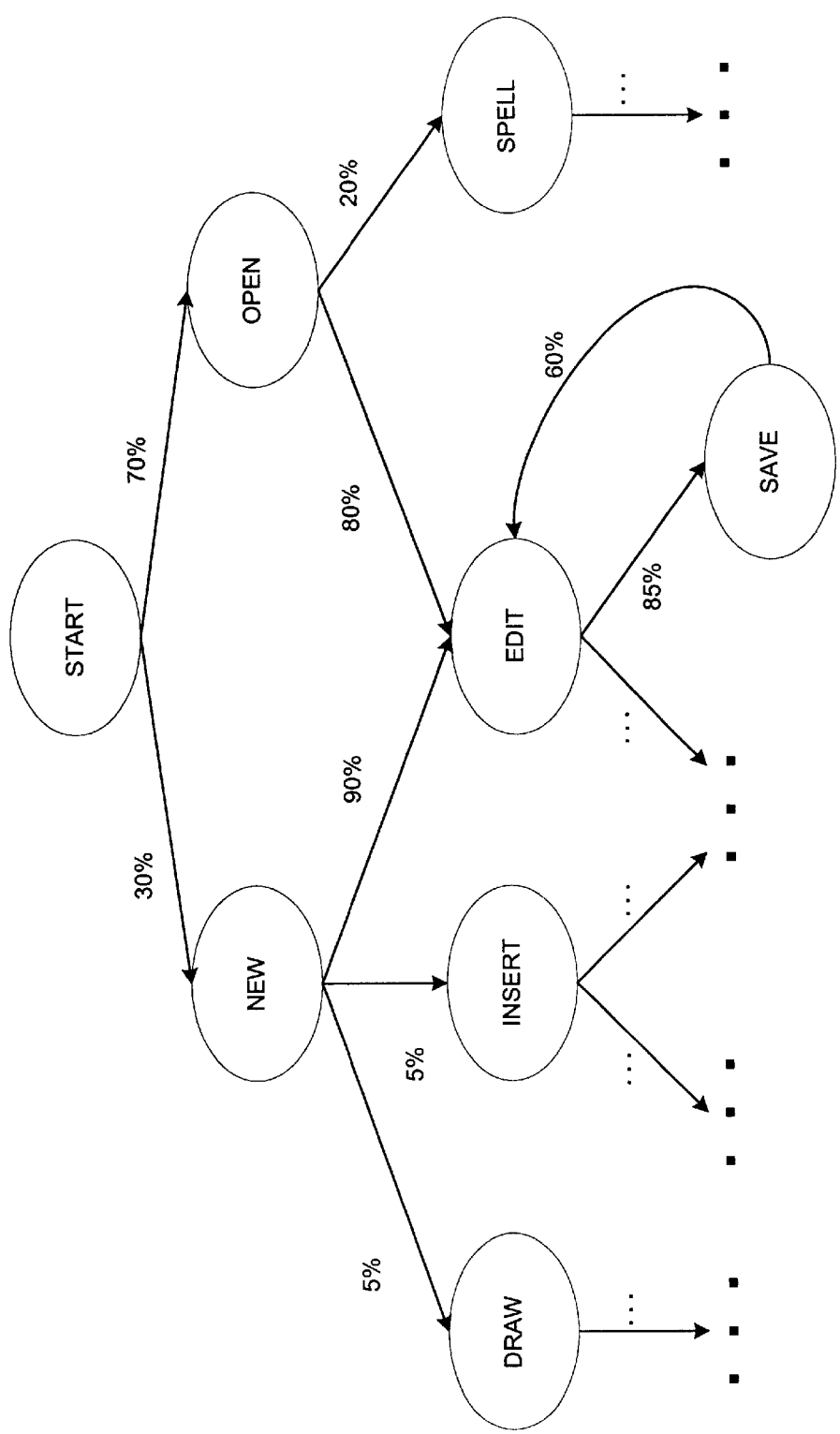
FIG. 2 is a sample usage graph used to predict usage of an application program.

Various statistical techniques can be used to analyze the sequence of code and data loads generated by an operating system as it executes an application and determine an optimal order to push the application streamlets to the client. In one embodiment, the predictive knowledge base can be viewed as a graph where a node is a user request (e.g. save, load) and an edge is the calculated probability that such a request will be made. A simple example of such a graph is shown in FIG. 2. By examining the links flowing from a given node, the system can easily determine the most likely future requests and, with access to an appropriate database, determine the streamlets which will be needed by the application to execute those requests. When the user strays from the predictive path and an on-demand request is issued, the predictive routine can be re-centered on the appropriate node associated with the on-demand request and the predictive stream restarted from that point.

The predictive graph of usage probabilities can be updated continuously in response to the usage data provided by the clients connected to the server. In this manner, the Server can adapt its model to different usage patterns, depending on the population of users who actually use the application. Several different models can be provided for each application based on the type of user at issue. For example, one set of users accessing a desktop publishing application may concentrate on text-based functionality while another set of users accesses generally graphical functions. Different predictive models may be appropriate for the various user-types. The system can dynamically assign users to various type categories based on an analysis of their usage patterns. Personalized predictive models can also be generated in which the activity of a particular user is analyzed and used to generate a personalized predictive model.

As will be recognized by those of skill in the art, other techniques for selecting which streamlets to forward to the client can also be used. While the efficiency with which a streamed application is executed on the client machine can vary depending on the order in which the streamlets are delivered, provided that the server is generally compatible with the basic communication protocols and data format used by the client, the operation of client side streaming support software is not generally dependant on the specific manner in which the server system is implemented. One preferred embodiment of a Predictive Streaming server is disclosed in more detail in co-pending U.S. patent application entitled "Method and System for Streaming Software Applications to a Client" which was filed concurrently with the present application, the entire contents of which is expressly incorporated by reference.

Figure 3:
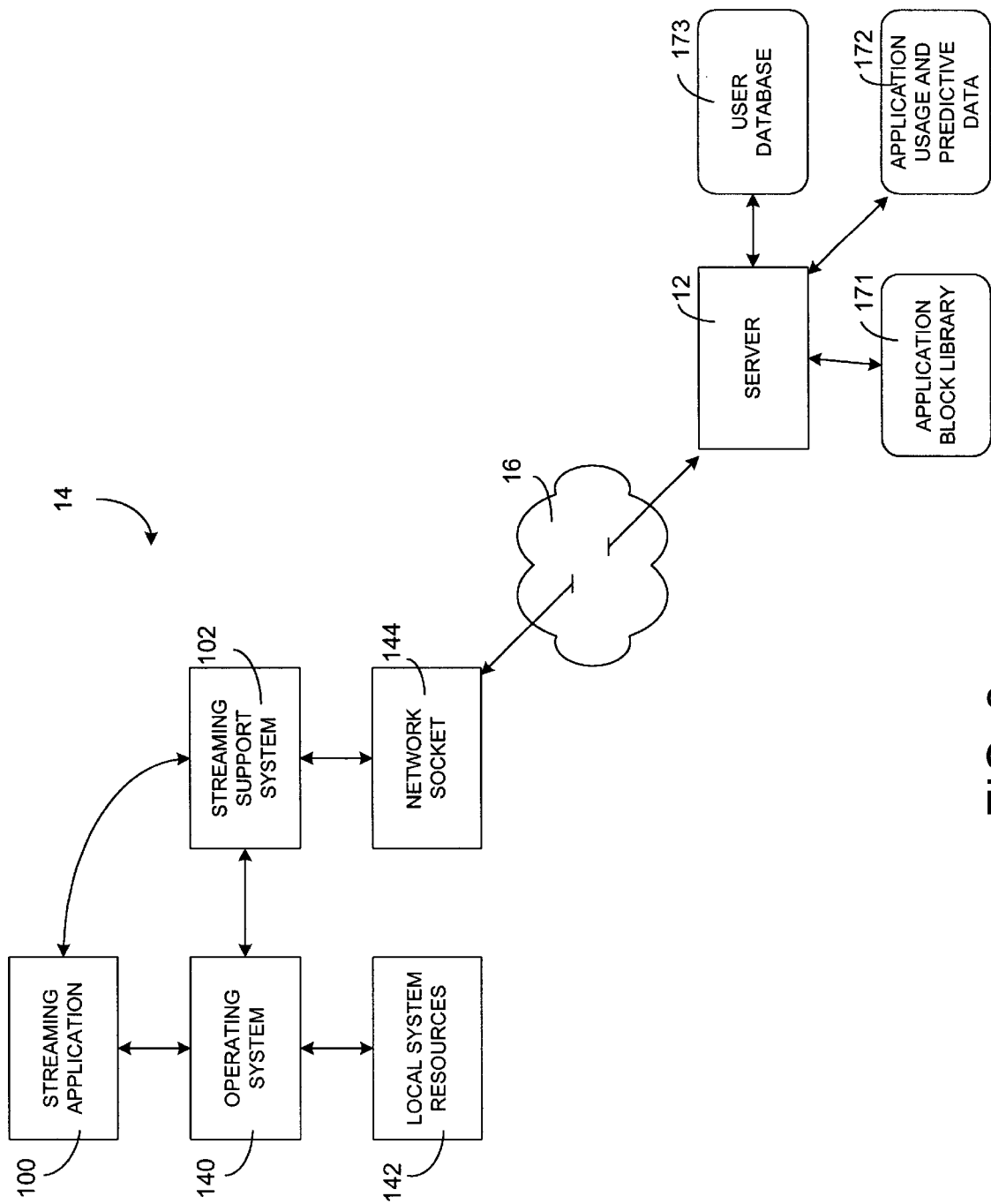
FIG. 3 is a high-level block diagram of the client and server architecture.

FIG. 3 is a block diagram showing the high-level architecture of the client 14 and server 12. As shown, the server 12 can have access to one or more databases which store information used to manage the application streaming. In one embodiment, the server can access an application library 171 which contains predefined sets of streamlets for various software applications. The server also has access to the predictive data model 172 which contains information about the usage patterns of the application, i.e., the probability that the application will require a given block $B_n$ of one or more streamlets if the last block used was $B_m$. A user database 173 can also be provided for storing various user-specific information for use in authorizing access to streamed application, storing information related to streaming order, etc.

The client system 14 comprises an operating system 140 which can access a variety of local system resources 142, such as data storage devices and memory. A streaming support system module 102 is provided and contains streaming control software which is generally configured to initiate the streaming of streamlets from the server 12 through, e.g., network socket 144, initiate the execution of a specified streaming application 100, process received streamlets, request specific streamlets from the server when necessary, and make received streamlets available for use by the application in a manner which is generally transparent to the native operating system 140.

Figure 4:
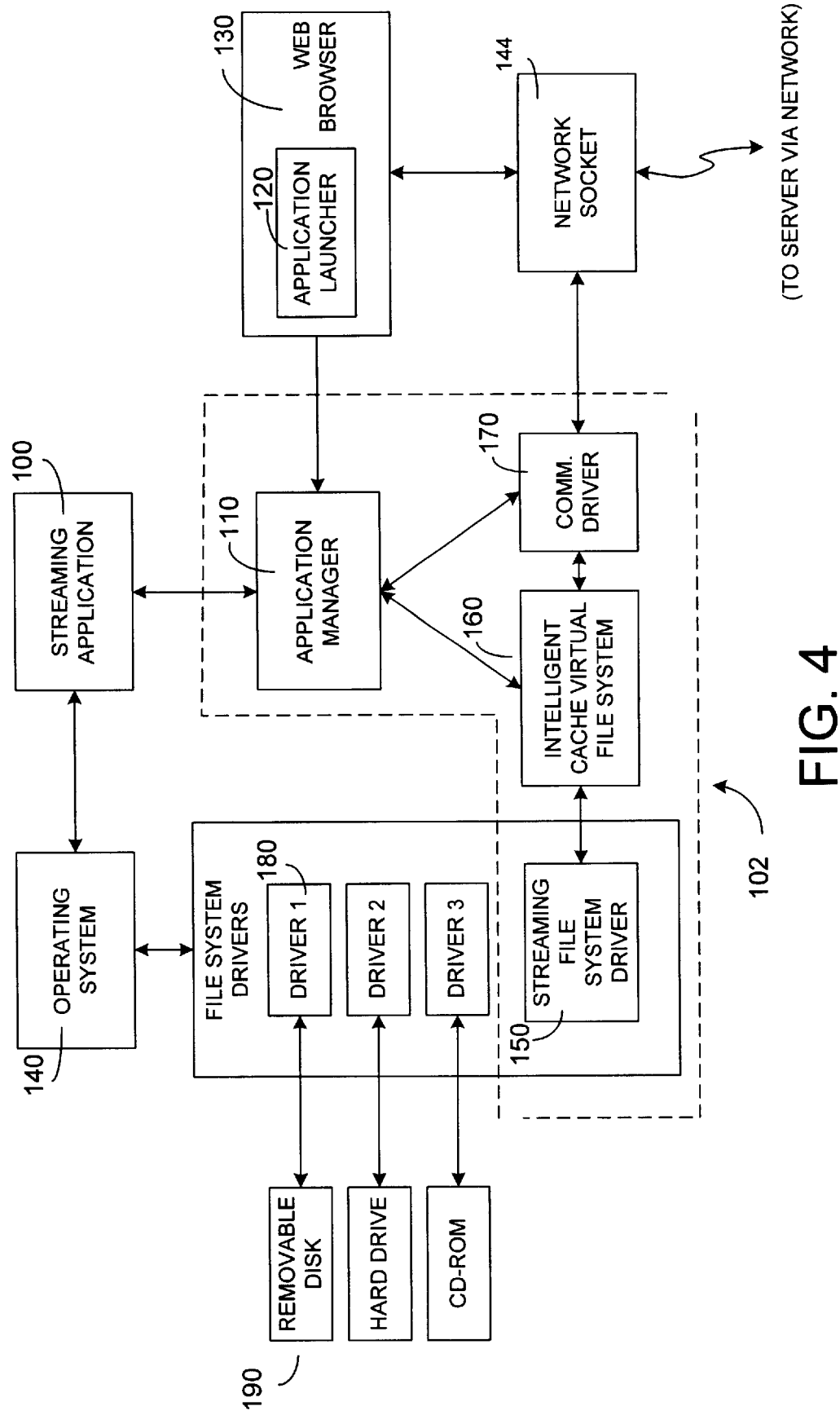
FIG. 4 is a block diagram of the client system showing various elements of the streaming control system illustrating various.
Figure 5:
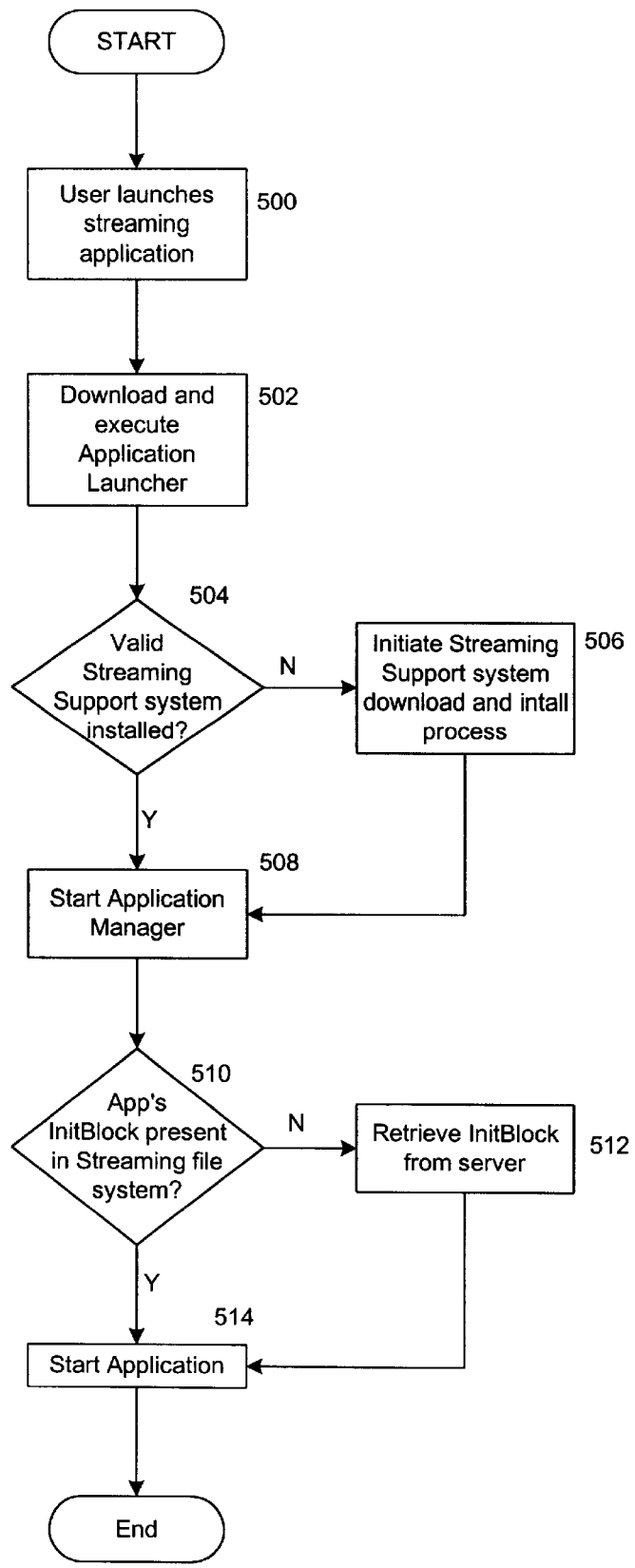

FIG. 4 is an illustration of a more detailed block diagram of the client system 14 showing various streaming control modules which comprise a preferred implementation of the streaming support system 102. FIGS. 5, 6A, and 6B are high-level flow diagrams illustrating the operation of the client streaming software.

With reference to FIG. 4, the operating system 140 will generally have access to one or more data storage devices 190, such as a removable disk, a hard drive, and a CD-ROM. Each storage device 190 typically has an associated device driver 180 which acts as an interface between the standard I/O protocols used by the operating system 140 and the specific I/O protocols used by the given device 190.

According to one aspect of the invention, a virtual file system ("VFS") 160 is provided to store and organize received program streamlets and present an appearance to the operating system 140 that all of the application files are locally present. The VFS 160 resides on a local storage device, such as the client's hard drive. Some or all of the VFS 160 can alternatively be retained in system memory. A streaming file system device driver ("FSD") 150 is provided to act as an interface between the operating system 140 and the VFS 160. The VFS 160, through the FSD driver 150, is configured to appear to the operating system as a local virtual file system which can be accessed by the operating system in the same manner as other data storage devices 190. When a streaming application is launched, it is configured to indicate the VFS 160 as the source for application files. Thus, from the operating system point of view, the application appears to be present on a local drive. However, unlike a conventional local file system 190, such as a hard disk or CD-ROM accessed through a conventional device driver 180, the VFS 160 does not need to (and generally will not) contain complete copies of the various required application files. Instead, only those portions of the various data files which have been provided to the client as streamlets are present. The data behind some files may be missing and other files may be only partially present.

In addition to the VFS 160 and FSD driver 150, the streaming support system 102 can also comprise an application manager 110 and a communication driver 170. The application manager 110 is preferably configured to initiate execution of a streaming application after sufficient streamlets have been received. In addition, the application manager can "register" the streaming applications with the VFS 160 and/or FSD 150 to limit access to the streamed data to authorized applications as a way of preventing a user from extracting streamed data from the VFS 160 without authorization. The Application Manager 110 can be further configured to monitor and meter the usage of the program, to indicate the application status to the end user, and perform or initiate cleanup functions when the application is terminated. The communication driver 170 is configured to process streamlets which are pushed to the client from the server and issue requests to the server for streamlets needed by the VFS.

As will be recognized by those of skill in the art, the functionality of the communication driver 170 can be combined with that of the application manager 110. Similarly, the functionality of the application manager 10 can be combined with other modules and a separate application manager module need not be provided. Thus, various functions of the application launcher 120 and application manager 110 can be combined into a single module. Similarly, the functionality of the application launcher 110 and communication driver 170 can instead be implemented in the VFS 160. The specific implementation of the application manager functions is dependent on the operating system and the complexity of the streaming environment, among other factors.

Turning to FIG. 5, when a user wants to execute a streaming application 100 on a client PC computer running an operating system 140, such as one of the Microsoft Windows operating systems, the user of the client system access the server 12 and initiates an application launch procedure. The server can be accessed in various ways. In a preferred embodiment, access to the server is provided through a Web page displayed by a Web browser 130, or through a special application residing on the client and providing access to the server 12. In a web-browser based implementation, a special, small software module 120, such as an applet or an embedded object, is included within or loaded through a streaming application startup-page. The startup web page can be hosted on the server 12, a third party server, or even stored on the client machine. When the link to the desired streaming application is triggered by the user (step 500), the application launcher 120 is downloaded from the server if necessary and then executed (step 502). The link to the application launcher 120 can be provided as a icon on the client system desktop, an Internet URL link, or any other suitable link or pointer. A log-on routine can also be provided to ensure that the user has authorization to access the particular application at issue and to verify that the user does, in fact, want the application to launch.

On startup, the application launcher 110 checks for the availability of a valid client environment on the client (step 504). In particular, a check is made to ensure that the particular software modules from the streaming support system 102 which are required to manage the streaming of applications are present. If a valid client system is not installed, a client installation process can be executed to download the required streaming support system files from the server and install them on the client system (step 506). Once the client environment is verified, the application manager 110 is started. (Step 508).

When the application manager 110 is started, it is provided with information that identifies the streaming application to execute and also indicates which streamlets or blocks of the application are required for initial execution. This information can be passed in whole to the application manager 110 as startup parameters or some can be fetched from the server. More preferably, application information is included in the Startup Block provided to the client by the server, to specify details about files, directories, environment settings, etc., that are relevant to the particular application.

When first starting an application, the application manager 110 checks the VFS 160 to determine if the Startup Block for the application is already present, as may be the case if the user has previously executed the streaming application. (Step 510). If the initial Startup Block is present, the application manager 110 instructs the operating system using standard operating system procedures to load and run the application from the VFS 160. (Step 514). If the initial blocks are not present, a fetch request will be issued to the server for the starting set. Once this initial set has been retrieved from the server and stored in the VFS 160 (step 512), the application is executed. In a preferred implementation, the client system notifies the server when a streaming application is started or restarted and indicates in this notification whether the startup block is required.

The VFS 160 appears to the local client as a drive which contains the application files. While information about the folder/file structure of the streaming application is available, the actual data in the files may or may not be resident. When the application is started, the operating system will attempt to load the initial application executable file and possibly additional library files, such as DLLs. Many conventional operating systems, such as the various Windows™ operating systems from Microsoft Corporation, use memory mapped file mechanisms. This functionality allows a portion of a file to be loaded into memory and the remaining aspects of the file to be represented as missing code pages. As the loaded executable or DLL is processed, the operating system issues a series of page faults or similar input requests to dynamically load additional needed portions of the file into memory.

The specific mechanisms for dynamically loading sections of an application file or library vary in accordance with the operating system at issue and will be known to those of skill in the art. For example, in a Windows operating environment, the LoadLibrary API can be called from an application to have the operating system load a DLL In response, the header of the DLL is read and loaded into memory. The remainder of the DLL itself is 'loaded' using a memory mapped file mechanism which represents the additional portion of the DLL as a series of absent pages or code blocks for the various functions defined in the DLL. The additional parts will be loaded dynamically through faults conditions as functions are called from the DLL. In particular, using the DLL header information, when the operating system detects that a unloaded function of a DLL is required, a data read operation is issued to load the needed portion of the DLL. Typically, a DLL contains many functions, only one or a few of which are needed immediately after the DLL is loaded and thus the majority of the DLL may remain absent from memory for some time after the initial DLL load.

Turning to FIG. 6A, when a Page Fault exception occurs in the streaming application context, the operating system issues a paging request signaling that a specific page of code is needed for the streaming application. A typical request will specify the drive, file name (or handle), offset, and length of the data block(s) to retrieve. Because the operating system 140 views the application as residing on the virtual file system "drive" 160, it will automatically direct the paging request to the dedicated streaming FSD driver 150. When the FSD 150 receives a paging request (step 600), it passes the request to the FSD 150, and thereby to the VFS 160 which determines if the desired data is available (Step 602). If the page is present, it is retrieved and returned to the operating system. (Step 608). In many cases, as a result of the predictive streaming, the desired page will already reside in the Cache/VFS 160. Thus, even though the entire application is not present on the client system, the user sees a responsiveness equal or similar to that of a locally running application.

When the desired page is not available, a fetch request for the needed data is sent through the communication driver 170 (or an alternate route, depending on implementation specifics) to the server 12. (Step 604). The VFS 160 waits until the request to the server has been fulfilled. After the requested streamlets have been received from the server and are stored in the VFS (step 606), the data is returned to the operating system (step 608). A busy or wait flag can be presented to the operating system during the time the fetch request is outstanding. As can be appreciated, if there are multiple streaming applications or application threads operating at the same time, the VFS may be able to process a subsequent data retrieval request from the operating system even when a prior request is still pending due to an outstanding streamlet fetch request at the server.

The format and content of the fetch request issued by the VFS 160 and/or application manager 110 can vary. In one embodiment, the request specifically identifies the streamlets which are required. Alternatively, details regarding the faulting input request issued by the operating system, such as the file name, offset, and length, can be forwarded to the server which then determines the appropriate streamlet data blocks to be returned and may also return additional data not yet requested if it determines that the additional data be required shortly. In particular, the server can reset position in the Usage Data graph 172 to reflect the user's new position in the application's usage space to ensure that the predictive algorithm will continue to predict the most likely streamlets in response to user's actions.

In general, after the server 12 is notified that a streaming application has been started, e.g., by a message forwarded from the client system or in response to a request for the Startup block set from the client, the streaming process will preferably commence and can remain active throughout the application session. As a result, the client machine will receive streamlets pushed from the server. In a preferred embodiment, and with reference to FIG. 6B, when a streamlet is received at the client (step 620), the streamlet is processed, e.g., by the communication driver 170. Initially, the data integrity of the streamlet is verified (step 622). If the received streamlet is corrupt (step 624), it is discarded and a resend request is issued to the server (step 626). Provided the data is verified, the received streamlet data is added to the VFS 160. (Step 630). If the streamlet was sent in response to a VFS fault, (FIG. 6A, step 604), the VFS can then be notified that the request has been fulfilled (step 634).

Figure 7:
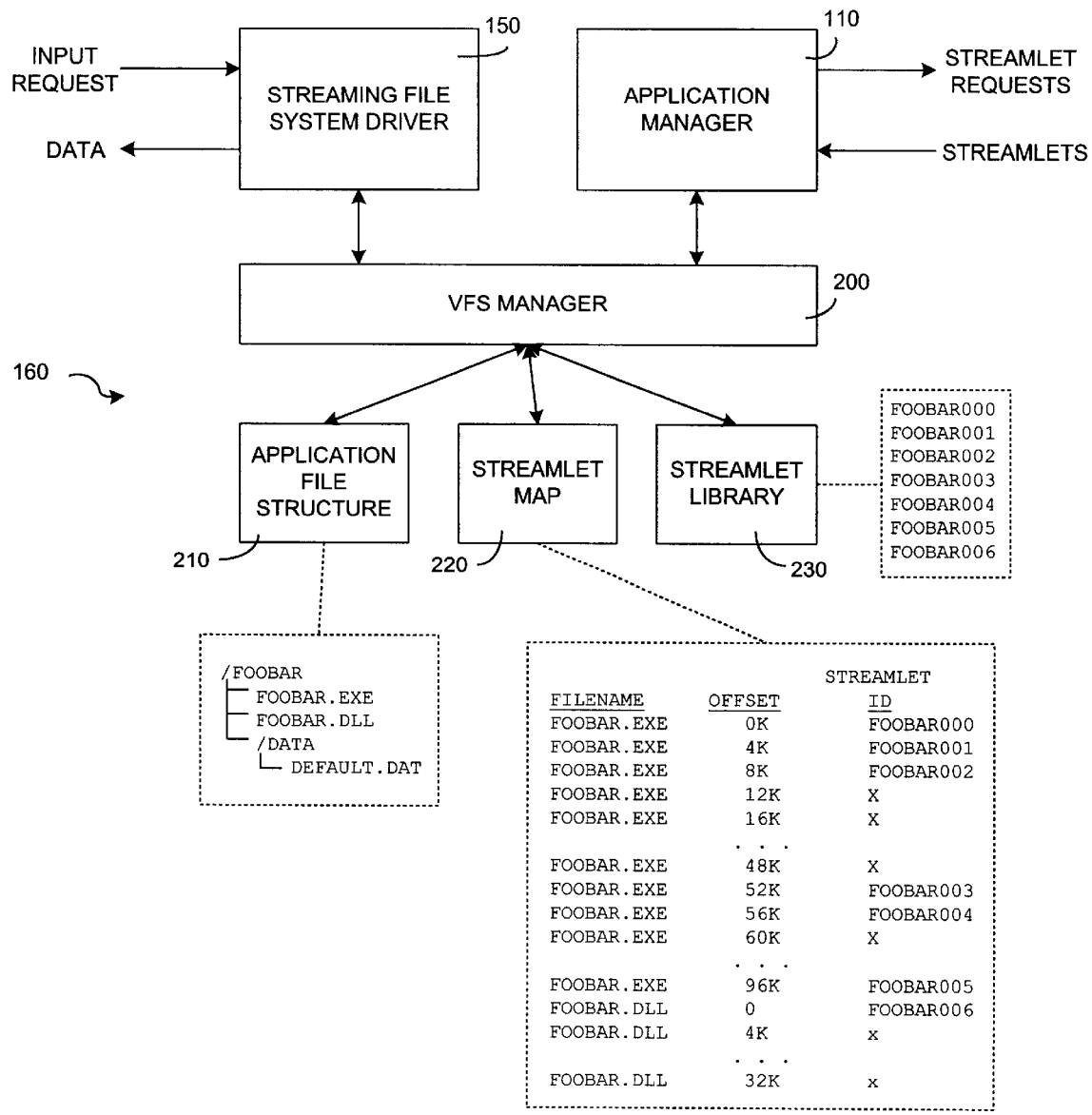
FIG. 7 is a block diagram of one embodiment of a virtual file system containing a partially streamed application.

Turning to FIG. 7, there is shown a block diagram of a preferred embodiment of a VFS 160. which is configured to appear to the local client as a drive which can be accessed through the FSD driver 150. The VFS 160 comprises a VFS Manager module 200 which provides a functional interface to a plurality of data files that contain the streamed data and information needed to map that data to the application files. In particular, the VFS 160 includes an application file structure database 210 which contains the complete folder/file structure for each streaming application. In addition a streamlet library 230 is provided within which received streamlets are stored. A streamlet map 220 can be used to associate the various streamlets in the library 230 with a respective file name and position within that file.

The various libraries, maps, and databases used by the VFS 160 can be stored in RAM, in appropriate data files on a conventional local device, such as a hard drive, or distributed between various short and long-term storage devices. In one embodiment, the application file structure and streamlet map information is retained in RAM while the streamlets in the streamlet library are stored on a local hard disk. To prevent unauthorized access to the streamlets (and thus various portions of the application files), one or more of the streamlets in the library, the streamlet map, and the application file structure can be stored in an encrypted or other proprietary format.

FIG. 7 shows representative data for an simple example application FOOBAR which consists of a 100 k executable, FOOBAR.EXE and a 40 k library file, FOOBAR.DLL, both of which are stored under the application folder FOOBAR. A data file, DEFAULT.DATA, is also provided under a DATA subfolder. When the user initially starts streaming this application, the Startup block is retrieved from the server by the application manager 110 and the VFS manager 200 adds the data is added to the various library files 210–230. In particular, the file structure is added to the File Structure Library 210 as shown.

Figure 8:
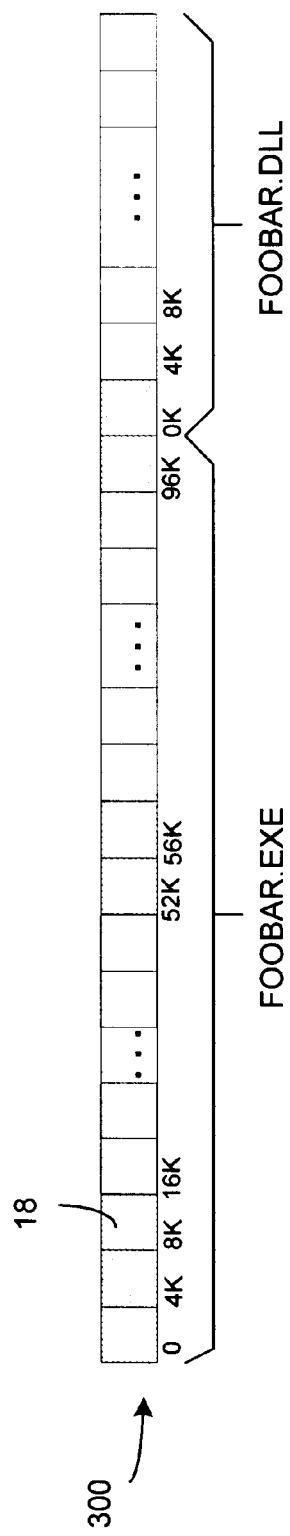
FIG. 8 is an illustration of a drive map of the partially streamed application of FIG. 7.

Preferably, each streamlet (when uncompressed by the client if necessary) has a size which corresponds to the standard I/O code page used by the native operating system. A typical size is the 4 k code page used in Windows operating systems. In this example, the Startup Block contains 28 k of data in seven 4 k streamlets, six of which are associated with various sections of the executable, and one which is associated with the DLL (and here is the DLL header). The streamlet map database 200 indicates which parts of the various application files each streamlet is associated with. For example, the streamlet FOOBAR001 is a code page in the FOOBAR.EXE file beginning at offset 4 k. FIG. 8 shows an illustrative drive map 300 of the sparse file system containing 24 k of the executable and 4 k of the DLL in accordance with the streamlet map 220 shown in FIG. 7.

The streamlet map 220 is shown in a basic table format for simplicity. Also shown in the sample streamlet map 220 are absent code pages. For example, the code page starting at an offset of 4 k in the DLL file is not defined in the map, here having an associated streamlet ID of "x", and is therefore considered absent. As will be appreciated, absent streamlets need not be defined expressly. The actual mapping and local streamlet storage can be done in a variety ways using various database and linked object mechanisms and data structures which are known to those of skill in the art. In one implementation, the map is stored, at least in part, as a binary table with a bit corresponding to each block in each file. Thus, the sample 140 k file set would contain 35 bit entries reflecting the presence or absence of the twenty five 4 k blocks in the executable and the ten blocks in the DLL.

After the data in the Startup Block is loaded into the database files, the application is executed. During execution, streamlets (e.g., additional code pages) forwarded by the server are received by the application manager 110 where, after verification, they are passed to the VFS manager 200 which adds the streamlets to the library 230 and updates the map 220 accordingly. When a page fault occurs, the application issues a data load which is passed in an appropriate format to the VFS manager 200 by the FSD driver 150. The VFS manager accesses the map 220 to determine if the required code pages are present and, if so, returns the requested data.

For example, when the application, perhaps in response to user input, requires the DLL to be loaded, an I/O request for the header is issued and which, in the example, is the 4 k code block represented by streamlet FOOBAR006. As the header is processed by the application, a series of additional page faults associated with the needed library functions are issued. Because these additional code pages are not present in the streamlet library, the VFS manager 200 initiates a request for additional streamlets as discussed above.

Thus, the virtual file system 160 implements a sparsely populated file system wherein the VFS 160 knows the framework, files, folder/directory structure, etc., which would exist if the application were fully installed, but (unknown to the operating system) the actual file contents are only partially existent in local storage. Advantageously, the streaming mechanism leverages a conventional property of the operating system which uses memory mapped files to avoid having to load complete files into memory to thereby avoid having to stream more than a small portion of an application to a client before initiating execution and to transparently manage the subsequent operation of the application without having to modify the application code or data in any way.

In configurations where the server autonomously streams data to the client, it is useful in making the selection of which streamlets to forward for the server to monitor the state of the client executed streamed application. Simple feedback is provided by the stream of data fetches which are issued by the client when needed data is absent. In a further embodiment, the VFS 160 can monitor the code pages accessed by the streaming application and the order of access, even if those pages are locally present, and forward this tracking data to the client, e.g., on a periodic basis. Such information can be useful in refining a predictive model used to determine an optimal order in which to send streamlets to a client.

Depending on the amount of storage available to the VFS 160, it may become necessary to remove streamlets from the library. Various techniques used to purge data items from a cache can be used in this situation as well. In some implementations, the server 12 can keep track of the streamlets which are present on a given client and use this information as part of the predictive streaming process. In particular, the server can reference this data to avoid sending duplicate streamlets to a client. In such a situation, it may be beneficial for the VFS 160 to provide notice to the client when one or more streamlets must be dropped from local storage. Alternatively, when local streamlets must be purged from storage, the server can be queried as to which streamlets to purge. In response, the server can use the predictive streaming routines to identify those streamlets which are present on the client and which are least likely to be needed and forward this information to the client so the identified streamlets can be purged.

In one particular embodiment, the server maintains a shadow copy of the streamlet map (e.g., in a binary table format) which should be present on the client. This image can become out of date if the Client discards blocks from the cache. In this case, eventually, an on-demand request will be issued by the client for a block which the Server shows as existing on the Client side. The Server can then request an image update, in response to which the Client will send a bitmap image of the VFS population. The client can also send an image to the server when a previously run is being restarted or in response to the server sending a streamlet which is already present on the client to ensure that the server has the most current VFS image.

According to a further aspect of the invention, the VFS 160 is configured to prevent a user from running a streaming application locally without first accessing the server 12 and requesting the streaming application be initiated. This feature can be useful, for example, to control use of the application as per license agreements or for billing purposes.

In one technique, one or more key blocks of code or data are specially flagged to prevent them from being persistently stored in the VFS 160 between sessions. When the streaming application exits, these tagged blocks are deleted. To execute the application, the user must reaccess the server and retrieve these key blocks. Alternatively, the streamlets can be encrypted and the key(s) stored in the VFS 160 only for the authorized period of time.

In another technique, the VFS 160 or FSD driver 150 can contain a registry of running authorized streaming applications. Such a registry can be created by the application manager 110 when a new streaming application is started. To prevent a user from copying the stored streamlets to a local drive, the streaming FSD 150 can be configured to only process read or page-in requests from the operating system which are generated on behalf of the application itself or on behalf of other approved processes. Various techniques are available for determining the process originating a data I/O request in a Windows environment, which techniques will be known to those of skill in the art.

It should be noted that in this overall system, there is preferably no direct access from the operating system level to the server 12. Communication with the server 12 is performed using a streaming data protocol implemented by, e.g., communication driver 170, and is generally limited in scope to the initiation of a streaming application and the subsequent processing of streamlets and forwarding of usage data. As a result, operating system level operations such as copy or erase/delete files, etc., cannot be performed from the client side on the Server file system, further securing the streamed application from unauthorized access and use. Additional features, such as handshaking protocols, version control, etc., can be included in this communication protocol to increase the overall system security. This is in sharp contrast to other application service providing technologies, which simply extend the file system into the remote server, so that the server looks to the client operating system like a remote disk drive or remote file server. Such schemes can are also be substantially slower, since they do not take advantage of "deep" predictive algorithms, but can only use simple, heuristic approaches such as cache read-ahead, which deliver several contiguous blocks of data into the local Client context in addition to the required block(s).

According to further aspects of the invention, the general application streaming methodology disclosed above can be integrated with a billing systems to implement various Application Service Provider models, such as Pay-Per-Use, time-based payment, subscriptions, or function-based payment. A graphical user interface can be provided to permit the user to view and manipulate a streamed application's status. For example, the user can view the dynamic state of the application's presence in the VFS along with a prediction of how long it would take to enable use of various application features which are not present, and perhaps additional fees associated with those features. The prediction can be made based on a determination of the number of streamlets associated with the features which are not already present in the virtual file system combined with an estimated streamlet delivery time.

Various hardware platforms can be used to implement the client and server systems. Preferably, the client system is implemented on a conventional desktop, laptop, or handheld computer running one of the various Windows operating systems, such as Windows 95, 98, Millennium, Windows NT, and CE. Network access can be provided via standard network applications and web-browsers, such as Internet Explorer and Netscape. The streaming server is preferably implemented using a Windows NT or Solaris environment. As will be appreciated, because the server does not execute the streamed program, but simply pushes data blocks and services requests, the server's operating environment does not need to be compatible with the client environment.

While the invention has been particularly shown and described with reference to preferred embodiments thereof, it will be understood by those skilled in the art that various changes in form and details may be made without departing from the sprit and scope of the invention. For example, different applications may reside on multiple servers and a user executing several streaming applications may access multiple servers. In addition, the breakdown and division of functionality between the various software routines comprising the streaming support system 102 can vary depending on implementation issues and various design choices and the functionality attributed to a particular module can be performed by a separate routine. Further, the functionality of two or more modules can be combined into a single package. Thus, for example, the functionality associated with the Streaming File System driver 150 and the Virtual File System 160 can be combined into a single module. Other divisions and combinations of functionality are also possible.

What is claimed is:

1. A method for executing a streamed application on a client system having an operating system and connected to an application server via a network, the application being divided into a plurality of streamlets, each streamlet containing a portion of a file associated with the application, the method comprising the steps of:

receiving from the server a file structure specification for at least a primary application file of the application when the application is installed on a computer;

configuring a virtual file system on the client which interacts with the operating system as a local data storage device to appear to the operating system that the files defined in the file structure specification are present in the virtual file system;

in response to the operating system issuing a data retrieval request to retrieve a portion of a specific file from the virtual file system:

(a) determining if the streamlets corresponding to the specified portion of the specific file are present in the virtual file system, (b) sending a fetch request to the server indicating a data missing condition if the corresponding streamlets are not present and adding streamlets returned from the server to satisfy the fetch request to the virtual file system, and (c) returning the requested portion of the specific file to the operating system.

2. The method of claim 1, further comprising the steps of:
receiving unrequested streamlets from the server; and
adding the unrequested streamlets to the virtual file system.

3. The method of claim 1, further comprising the steps of:
receiving from the server a startup streamlet set containing at least a minimal set of streamlets sufficient for execution of the application to be initiated; and
adding the streamlets in the startup streamlet set to the virtual file system.

4. The method of claim 3, wherein the startup streamlet set comprises application streamlets sufficient to begin application execution and have the application run to a point where user interaction is required.

5. The method of claim 3, wherein the file structure specification and the startup streamlet set are received by the client as part of a startup block.

6. The method of claim 1, further comprising the step of informing the operating system that the virtual file system is processing the data retrieval request during a period between the sending of the fetch request and when the fetch request is satisfied.

7. The method of claim 1, wherein the application file set comprises all application files which are required for the application to operate.

8. The method of claim 1, further comprising the steps of:
forwarding to the server a request to start the streaming application;
verifying that the virtual file system is present on the client system; and
if the virtual file system is not present, installing the virtual file system on the client.

9. The method of claim 8, wherein the step of installing the virtual file system comprises installing a streaming file system device driver which acts as an interface between the operating system and the virtual file system.

10. The method of claim 1, further comprising the steps of:
maintaining a record of processes authorized to access the virtual file system; and
blocking data retrieval requests issued by the operating system to the virtual file system which are not generated on behalf of an authorized process.

11. The method of claim 1, further comprising the step of decompressing streamlets retrieved from the server.

12. The method of claim 11, wherein streamlets are decompressed prior to adding them to the virtual file system.

13. The method of claim 1, further comprising the step of:
purging streamlets from the virtual file system in response to a storage low condition.

14. The method of claim 13, further comprising the step of informing the server when streamlets are purged from the virtual file system.

15. The method of claim 1, further comprising the step of purging at least selected streamlets from the virtual file system when use of the streaming application is terminated.

16. The method of claim 1, further comprising the steps of:
monitoring a sequence of data retrieval requests issued by the operating system to generate application usage tracking information; and
periodically forwarding the tracking information to the server.

17. The method of claim 1, further comprising the step of signaling the operating system to execute the primary application file from the virtual file system.

18. A method for executing a streamed application on a client system having an operating system and connected to an application server via a network, the application being divided into a plurality of streamlets, each of which corresponds to a code-page sized portion of an application file, the method comprising the steps of:

sending to the server a request to initiate the application;
receiving from the server a start block comprising a file structure specification for at least a primary file of the application when the application is installed on a computer and a startup streamlet set containing at least a minimal set of streamlets sufficient to begin application execution;

installing a virtual file system on the client which interacts with the operating system as a local data storage device via device driver;

configuring the virtual file system to the operating system that the files defined in the file structure specification are present in the virtual file system;

signaling the operating system to execute the primary application file from the virtual file system;

in response to the receipt of a streamlet from the server, adding the received streamlet to the virtual file system;

in response to the operating system issuing a data retrieval request to retrieve a sequence of code pages beginning at a specified portion of a specific file from the virtual file system:

(a) determining if the streamlets corresponding to the specified code pages are present in the virtual file system, (b) if the corresponding streamlets are present, returning the requested code pages to the operating system, (c) otherwise, sending a fetch request to the server indicating a data missing condition, presenting a busy condition to the operating system until the fetch request is satisfied and the corresponding streamlets have been added to the virtual file system, and returning the requested code pages to the operating system.

19. The method of claim 18, further comprising the steps of, after adding a received streamlet to the virtual file system,
determining whether the received streamlet completes an outstanding fetch request and, if so, indicating to the virtual file system that fetch request has been satisfied.

20. The method of claim 19, further comprising the steps of:
maintaining a record of processes authorized to access the virtual file system; and
blocking data retrieval requests issued by the operating system to the virtual file system which are not generated on behalf of an authorized process.

21. The method of claim 19, further comprising the step of decompressing streamlets retrieved from the server.

22. The method of claim 1, further comprising the steps of:
monitoring a sequence of data retrieval requests issued by the operating system to generate application usage tracking information; and
periodically forwarding the tracking information to the server.

23. A system for executing a streamed application on a client computer system having an operating system and connected to an application server via a network, the application being divided into a plurality of streamlets, each streamlet containing a portion of a file associated with the application, the system comprising:
a streaming support module comprising a virtual file system, the virtual file system including a streamlet library configured to store a plurality of streamlets and having data associating streamlets in the streamlet library with specific portions of files associated with the application;
the streaming support module being configured to permit communication between the operating system and the virtual file system as if the virtual file system were a local data storage device, issue fetch requests for streamlets to the server, and add streamlets received from the server to the streamlet library;
The streaming support module being further configured to respond to data retrieval requests issued by the operating system to retrieve a portion of a specific file from the virtual file system by:
(a) determining if the streamlets corresponding to the specified portion of the specific file are present in the streamlet library,
(b) if the streamlets are present, returning the data to the operating system,
(c) otherwise, initiating a fetch request to the server indicating a data missing condition and returning the requested code pages to the operating system after the fetch request has been satisfied.

24. The system of claim 23, wherein the streaming support module comprises
a virtual file system manager module configured to respond to data retrieval requests issued by the operating system; and
a streaming file system driver configured as an interface between the operating system and the virtual file system manager.

25. The system of claim 24, wherein the streaming support module further comprises an application manager configured to issue the fetch requests to the server and add streamlets received from the server to the streamlet library.

26. The system of claim 23, wherein the streaming support module is further configured to:
request from the server a startup block comprising a file structure specification for at least a primary file of the application when the application is installed on a computer and a startup streamlet set containing at least a minimal set of streamlets sufficient to begin application execution;
add the save the file structure specification in the virtual file system and add the streamlets in the startup streamlet set in the streamlet library; and
signal the operating system to execute the primary application file from the virtual file system.

27. The system of claim 26, wherein the startup streamlet set comprises application streamlets sufficient to begin application execution and have the application run to a point where user interaction is required.

28. The system of claim 23, wherein the streaming support module is further configured to present a busy condition to the operating system during a period between the sending of the fetch request to the server when data requested by the operating system is not present in the virtual file system and when the fetch request is satisfied.

29. The system of claim 23, wherein each streamlet corresponds to a code-page sized portion of a respective application file.

30. The system of claim 23, further comprising an application launcher module configured to, in response to an initiation of a streaming application, verify that various components of the streaming support module are present on the client system, retrieve missing components from the server and install the retrieved components on the client.

31. The system of claim 23, wherein the streaming support module is further configured to:
maintain a record of processes authorized to access the virtual file system; and
block data retrieval requests issued by the operating system to the virtual file system which are not generated on behalf of an authorized process.

32. The system of claim 23, wherein the streaming support module is further configured to:
monitor a sequence of data retrieval requests issued by the operating system to generate application usage tracking information; and
periodically initiate sending a message to the server including the tracking information.

33. A computer program product stored on a computer readable medium, the product comprising a computer program for executing a streamed application on a client system having an operating system and connected to an application server via a network, the application being divided into a plurality of streamlets, each streamlet containing a portion of a file associated with the application, the computer program comprising code to configure the client to:
receive from the server a file structure specification for at least a primary application file of the application when the application is installed on a computer;
configure a virtual file system on the client which interacts with the operating system as a local data storage device to appear to the operating system that the files defined in the file structure specification are present in the virtual file system;

in response to the operating system issuing a data retrieval request to retrieve a portion of a specific file from the virtual file system:
  (a) determine if the streamlets corresponding to the specified portion of the specific file are present in the virtual file system,
  (b) send a fetch request to the server indicating a data missing condition if the corresponding streamlets are not present and adding streamlets returned from the server to satisfy the fetch request to the virtual file system, and
  (c) return the requested portion of the specific file to the operating system.

34. The computer program product of claim 33, the computer program further comprising code to configure the client to:
  receive unrequested streamlets from the server; and
  add the unrequested streamlets to the virtual file system.

35. The computer program product of claim 33, the computer program further comprising code to configure the client to:
  receive from the server a startup streamlet set containing at least a minimal set of streamlets sufficient for execution of the application to be initiated; and
  add the streamlets in the startup streamlet set to the virtual file system.

36. The computer program product of claim 33, the computer program further comprising code to configure the client to inform the operating system that the virtual file system is processing the data retrieval request during a period between the sending of the fetch request and when the fetch request is satisfied.

37. The computer program product of claim 33, the computer program further comprising code to configure the client to:
  forward to the server a request to start the streaming application;
  verify that the virtual file system is present on the client system; and
  if the virtual file system is not present, install the virtual file system on the client.

38. The computer program product of claim 37, wherein the code to install the virtual file system configures the client to install a streaming file system device driver which acts as an interface between the operating system and the virtual file system.

39. The computer program product of claim 33, the computer program further comprising code to configure the client to:
  maintain a record of processes authorized to access the virtual file system; and
  block data retrieval requests issued by the operating system to the virtual file system which are not generated on behalf of an authorized process.

40. The computer program product of claim 33, the computer program further comprising code to configure the client to decompress streamlets retrieved from the server.

41. The computer program product of claim 40, the computer program further comprising code to decompress streamlets prior to adding them to the virtual file system.

42. The computer program product of claim 33, the computer program further comprising code to configure the client to:
  purge streamlets from the virtual file system in response to a storage low condition.

43. The computer program product of claim 42, the computer program further comprising code to configure the client to inform the server when streamlets are purged from the virtual file system.

44. The computer program product of claim 33, the computer program further comprising code to configure the client to purge at least selected streamlets from the virtual file system when use of the streaming application is terminated.

45. The computer program product of claim 33, the computer program further comprising code to configure the client to:
  monitor a sequence of data retrieval requests issued by the operating system to generate application usage tracking information; and
  periodically forwarding the tracking information to the server.

46. The computer program product of claim 33, the computer program further comprising code to configure the client to signal the operating system to execute the primary application file from the virtual file system.

* * * * *